March 24, 1964  E. HÜGLI  3,126,089

DETACHABLE CONNECTION FOR DRAG CONVEYOR CHAINS

Filed Aug. 22, 1961

INVENTOR:
ERNST HÜGLI

BY
M. Glew and Toren
ATTORNEYS

United States Patent Office 3,126,089
Patented Mar. 24, 1964

3,126,089
DETACHABLE CONNECTION FOR DRAG CONVEYOR CHAINS
Ernst Hügli, Steinacker, Uzwil, Switzerland, assignor to Gebrueder Buehler, Uzwil, Switzerland, a firm of Switzerland
Filed Aug. 22, 1961, Ser. No. 133,113
Claims priority, application Switzerland Aug. 30, 1960
6 Claims. (Cl. 198—171)

Various constructions have been proposed as detachable connections for tow or drag conveyor chains such as are used, for example, in trough chain conveyors. In most cases, projecting parts are present which are subjected to pronounced wear. Spring rings have been used also, which however call for high precision in manufacturing and machining the groove. When portions of the goods conveyed get into the spaces between spring ring and chain link, the ring may be forced aside over the groove flank which by necessity is kept low. Further, assembly of a large number of spring rings brings certain risks owing to the possibility that the rings may jump from the assembly pliers.

My present invention affords means for obviating these disadvantages and relates to a detachable connection for tow or drag conveyor chains of the type in which the chain links are held together by connecting pins into the groove or grooves of which are insertable slit lock washers. The improved connection disclosed by the invention is characterized by the facts that the lock washer is made of soft steel and in its initial integral form is movable over the end of the pin and in its final position is deformed in a plastic manner, the slit edges being pressed against each other.

In further development of the subject matter of the invention, some measures are disclosed for facilitating assembly and disassembly of the connection according to the invention. Two forms of the invention are shown, by way of examples, in the drawing, in which—

Figure 1:
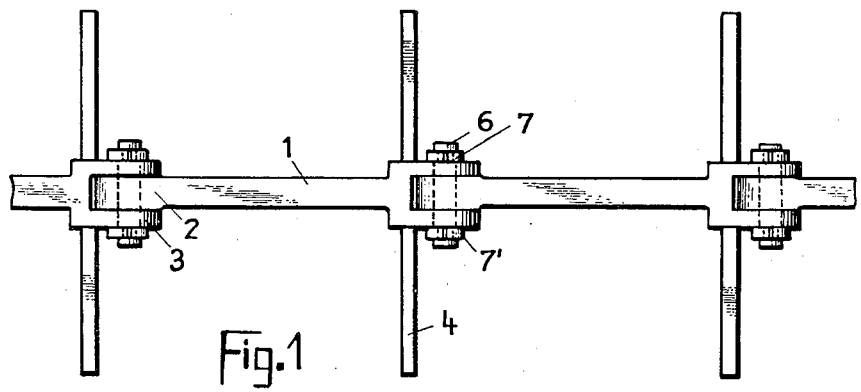
FIG. 1 shows a drag conveyor chain in plan.
Figure 2:
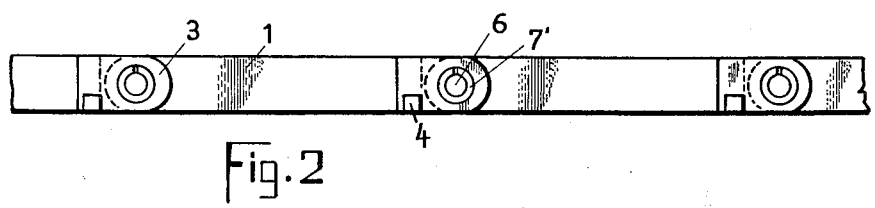
FIG. 2 is a side-view thereof.

In a tow or drag conveyor chain (FIGS. 1 and 2) the individual chain links comprise a web 1, a head 2, a fork 3 and a pair of clearing arms 4 for taking along the goods. Any two consecutive links are pivoted to each other on a pin 6 on which are mounted lock washers 7 that are inserted in grooves 9.

Figure 4:
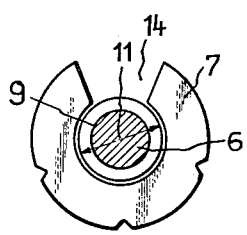
FIG. 4 depicts the insertion of a lock washer in a view corresponding to a section on the line IV—IV of FIG. 3.
Figure 5:
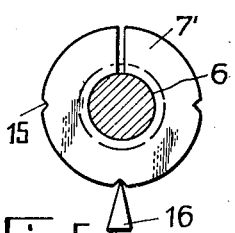
FIG. 5 shows the deformed lock washer in its final position.
Figure 3:
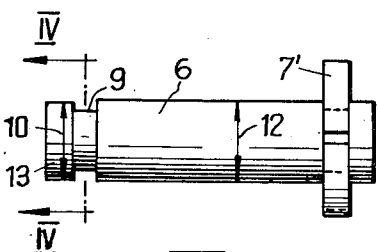
FIG. 3 is a side-view of the connecting pin.

The lock washers 7 (FIG. 4) are made of soft steel and their internal diameter 11 is greater than the diameter 10 of the end 13 of connecting pin 6. The washer is slid over the front portion 13 of pin 6 and stopped by the central portion of pin 6 of which the diameter 12 (FIG. 3) is slightly greater than the washer internal diameter 11. Lock washer 7 then is compressed to its final shape 7' (FIG. 5) so that the edges of slit 14 nearly contact each other.

The lock washers 7 are circumferentially notched at 15. When dismounting a chain link, a chisel 16 is set into one of the notches 15 for cutting the washer in two. The washer, therefore, can be used only once, but this is no substantial disadvantage in view of its low price.

Figure 7:
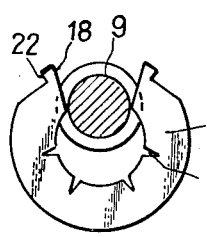
FIG. 7 depicts the insertion of a second form of the lock washer in a view corresponding to a section on the line VII—VII of FIG. 6.
Figure 8:
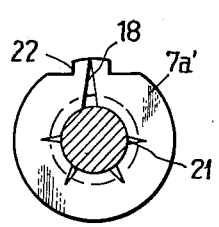
FIG. 8 illustrates the lock washer of FIG. 7 deformed in its final position.
Figure 6:
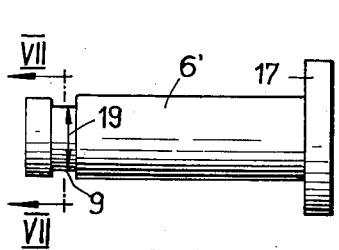
FIG. 6 is a side-view of a second form of the connecting pin.

The second form of connecting pin 6' (FIG. 6) comprises on one side a flange or collar 17 in place of the lock washer. The spacing of the slit edges 18 is slightly greater than the diameter 19 of groove 9 so that the washer 7a may be set radially into the groove (FIG. 7). In the deformed washer 7a' (FIG. 8) the edges of slit 18 are not parallel to each other which, however, is of no disadvantage.

Even when the spacing of the edges of slit 18 were slightly smaller than diameter 19 (FIG. 6) lock washer 7a still could be radially inserted by a slight hammer stroke.

Lock washer 7a (FIGS. 7 and 8) is notched at 21 on its internal circumference. Such notches facilitate deformation and the internal diameter bears better on the bottom of groove 9. Shoulders 22 in vicinity of slit 18 serve for applying a pair of pliers for deforming the lock washer.

What I claim as new and desire to secure by Letters Patent, is:

1. A detachable connection for pivotally coupling two apertured members comprising: a pivot pin including a central portion inserted through said apertured members, one extremity of said pin including locking means of a diameter larger than the diameter of said apertures in said members, the opposite extremity of said pin extending beyond said member, said extending portion of said pin having a groove formed therein intermediate the extreme end portion of said pin and said central portion thereof, the diameter of said central portion being greater than the diameter of said extreme end portion, and a retaining ring, including a central aperture therethrough, made of soft steel adaptable of being slid over said extreme end portion of said pin and deformable to bear circumferentially against the outer surface of said groove, said retaining ring's central aperture before deformation having a diameter smaller than the diameter of said central portion of said pin.

2. A detachable connection as set out in claim 1, in which the internal diameter of the washer in the initial shape thereof is slightly smaller than the diameter of the pin central portion.

3. A detachable and frangible connection as set out in claim 1 in which the washer on its outer circumference is notched for applying a chisel to destroy same when detaching it.

4. A detachable and destructible connection as set forth in claim 1 in which the washer is notched on its internal circumference.

5. In combination, a first member including a hole therethrough; a second member including a hole therethrough, said first and second members being arranged in juxtaposed relation such that said holes are in registration; an elongated pin extending into both of said holes and beyond both first and second members, said members being enabled to pivot about said pin, said pin having a central portion of fixed diameter situated in and extending between both said holes, each said portion of said pin which extends beyond said members having an extreme end portion and a groove, said groove being between said extreme end portion and said central portion, the diameter of said extreme end portion being smaller than the diameter of said central portion; and, deformable lock washers each including a central opening normally having a diameter larger than extreme end portion of said pin but smaller than the diameter of the pins' central portion whereby the lock washers may be slid over opposing extreme end portions of said pin and deformed so that the internal circumferences of said lock washers are conformed to bear, respectively, against the circumferential surfaces of said smaller diameter grooves.

6. In combination, at least first and second conveyor drag links, each said drag link including an elongated web portion, one extremity of said elongated web portion having a hole therethrough, the opposite extremity of said elongated web portion being bifurcated and including a space situated between two short limbs parallelly extending in the same axial direction as said elongated web, each said short limb having a hole therethrough, the holes in said limbs being in register, said one extremity of said elongated web of the first drag link being situated in said space between said short limbs of said opposing extremity of said web of the second drag link, a pivot pin extending through the hole in said elongated web's one extremity and through the holes of said two short limbs, said pivot pin having opposing end portions which extend beyond the respective short limbs, each said extending end portion of said pivot pin having an extreme end portion having a fixed diameter and an adjacent portion having a smaller diameter than said extreme portion, the portion of said pin extending through said holes having a diameter greater than said extreme end portions, and deformable lock washers each including a central opening normally having a diameter larger than said extreme end portions but smaller than the diameter portions of the pin which extends through said holes whereby the lock washers may be slid over opposing extreme end portions of said pin and deformed so that the internal circumference of said lock washer is conformed to bear against the circumference of said smaller diameter adjacent portions.

References Cited in the file of this patent

UNITED STATES PATENTS

| | | |
|---|---|---|
| 573,616 | Pollock | Dec. 22, 1896 |
| 1,348,517 | Porter | Aug. 3, 1920 |
| 2,025,848 | Collis | Dec. 31, 1935 |
| 2,629,412 | Cavanagh | Feb. 24, 1953 |

FOREIGN PATENTS

| | | |
|---|---|---|
| 771,697 | Great Britain | Apr. 3, 1957 |